United States Patent

Imai

[11] 4,221,467
[45] Sep. 9, 1980

[54] WIDE-ANGLE PHOTOGRAPHIC CAMERA LENS SYSTEM

[75] Inventor: Toshihiro Imai, Hachiouji, Japan

[73] Assignee: Olympus Optical Company Limited, Tokyo, Japan

[21] Appl. No.: 891,745

[22] Filed: Mar. 30, 1980

[30] Foreign Application Priority Data

Apr. 19, 1977 [JP] Japan .................................. 52-44920

[51] Int. Cl.² ............................................ G02B 13/04
[52] U.S. Cl. ................................................. 350/215
[58] Field of Search ........................................ 350/215

[56] References Cited

U.S. PATENT DOCUMENTS

| | | | |
|---|---|---|---|
| 3,506,339 | 4/1970 | Kazamaki | 350/215 |
| 3,955,883 | 5/1976 | Sugiyama | 350/215 |
| 4,008,952 | 2/1977 | Nakagawa | 350/215 |

FOREIGN PATENT DOCUMENTS 1187393  2/1965  Fed. Rep. of Germany ........... 350/215

*Primary Examiner*—Conrad J. Clark
*Attorney, Agent, or Firm*—Cushman, Darby & Cushman

[57] ABSTRACT

A wide-angle photographic camera lens system having a very short total length of 2.75 f and a back focal length of 1.33 f comprising a first positive meniscus lens, a second negative meniscus lens, a third positive thick lens, a fourth negative lens, a fifth positive meniscus lens and a sixth positive lens.

4 Claims, 4 Drawing Figures

WIDE-ANGLE PHOTOGRAPHIC CAMERA LENS SYSTEM

BACKGROUND OF THE INVENTION (a) Field of the Invention

The present invention relates to a wide-angle lens system for photographic camera having a half field angle of 27.5° and an aperture ratio of 2.8.

(b) Description of the Prior Art

Although retrofocus type wide-angle lens systems for photographic cameras consisting of relatively small number of lenses, i.e., six components of six lenses have conventionally been known to the public, there are available few lens systems which are designed so compactly as to be especially short in their total lengths. As a lens system invented in view of such circumstances, U.S. Pat. No. 4,008,952 disclosed a retrofocus type lens system consisting of six components of six lenses which has a short total length and wherein various aberrations are favorably corrected. However, said lens system is still insufficient in accomplishing the object to shorten total length of the lens system.

SUMMARY OF THE INVENTION

A general object of the present invention is to provide a retrofocus type large-aperture wide-angle lens system for photographic cameras consisting of six components of six lenses which has a short total length of 2.75f as the distance measured from the object side surface of the first lens to the film surface relative to its focal length and a back focal length of 1.33f.

The photographic camera lens system according to the present invention comprises a first positive meniscus lens, a second negative meniscus lens, a third positive thick lens, a fourth negative lens, a fifth positive meniscus lens and a sixth positive lens. Said lens system is characterized in that is satisfies the following conditions:

$$1/1.15 < f/|f_{12}| < 1/0.9, \ f_{12} < 0 \quad (1)$$

$$0.35 < d_4/f < 0.5 \quad (2)$$

$$0.33 < r_4/f < 0.38 \quad (3)$$

$$45 > \nu_1 \quad (4)$$

$$\nu_2 > 50 \quad (5)$$

wherein the reference symbols represents as defined below:

f: total focal length of the lens system as a whole $f_{12}$: total focal length of the first and second lenses considered as a whole $d_4$: airspace formed between the second and third lenses $r_4$: radius of curvature on the image side surface of the second lens $\nu_1$ and $\nu_2$: Abbe's numbers of the first and second lenses respectively Now, the significance of the above-mentioned conditions will be described detailedly.

In a retrofocus type wide-angle lens system, an important factor to determine total length of the lens system as a whole is ratio $f/|f_{12}|$ of the total focal length of the front diverging lens group, i.e., the first and second lenses in the lens system according to the present invention relative to the total focal length of the lens system as a whole, in addition to the airspace between the front and rear lens groups, i.e., the second and third lenses of the lens system according to the present invention. In other words, total length of the lens system is prolonged as $f/|f_{12}|$ becomes smaller. When said ratio is smaller than the lower limit of 1/1.15 of the condition (1), total length of the lens system is prolonged, thereby making it impossible to accomplish the object of the present invention. Similarly, the ratio $d_4/f$ is larger than 0.5 in the condition (2), total length of the lens system as a whole is prolonged, thereby making it impossible to compose a compact lens system. If $f/|f_{12}|$ is so large as to exceed the upper limit of 1/0.9 of the condition (1) for shortening total length of the lens system, however, the front lens group has such strong power as to aggravate astigmatism and distortion, thereby making it impossible to obtain desirable images. When $d_4/f$ is smaller than 0.35, in contrast, back focal length is too short and cannot be prolonged to 1.33f or so. In the lens system according to the present invention, power of the front lens group is enhanced to satisfy the condition (1) in order to shorten total length of the lens system as a whole, and therefore, it is difficult to obtain good symmetry of offaxial coma for each of the rays at different wavelengths (d line, F line, C line, g line) and favorably correct chromatic aberration. In order to obtain good symmetry of coma in the lens system according to the present invention, $r_4/f$ is selected within the range defined by the condition (3). Further, Abbe's number of the second negative lens is selected at 50 or higher as defined by the condition (5) for preventing chromatic aberration within a possible range and, at the same time, Abbe's number $\nu_1$ of the first lens is selected below 45 as defined by the condition (4) in order to correct residual chromatic aberration. If $r_4/f$ is smaller than the lower limit of 0.33 of the condition (3) of the above-mentioned conditions, coma will be undercorrected. If $r_4/f$ exceeds the upper limit of 0.38 of the condition (3), in contrast, coma will be overcorrected. If $\nu_1$ and/or $\nu_2$ deviate from the ranges defined by the conditions (4) and/or (5), it will be impossible to correct chromatic aberration favorably. In a wide-angle lens system of the type described above, offaxial curvature of field will be largely dependent on refractive index of the third positive lens. From this viewpoint, it will be more preferable to select refractive index $n_3$ of the third lens at 1.74 or higher so as to minimize its Petzval's sum.

DESCRIPTION OF THE PREFERRED EMBODIMENTS

Figure 1:
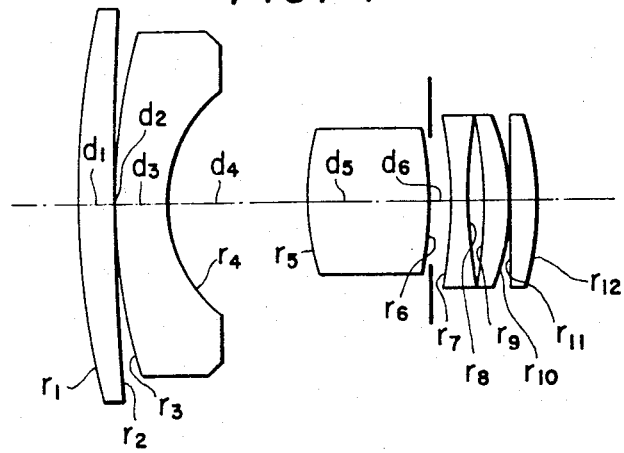
FIG. 1 shows a sectional view illustrating the composition of the wide-angle photographic camera lens system according to the present invention.
Figure 2:
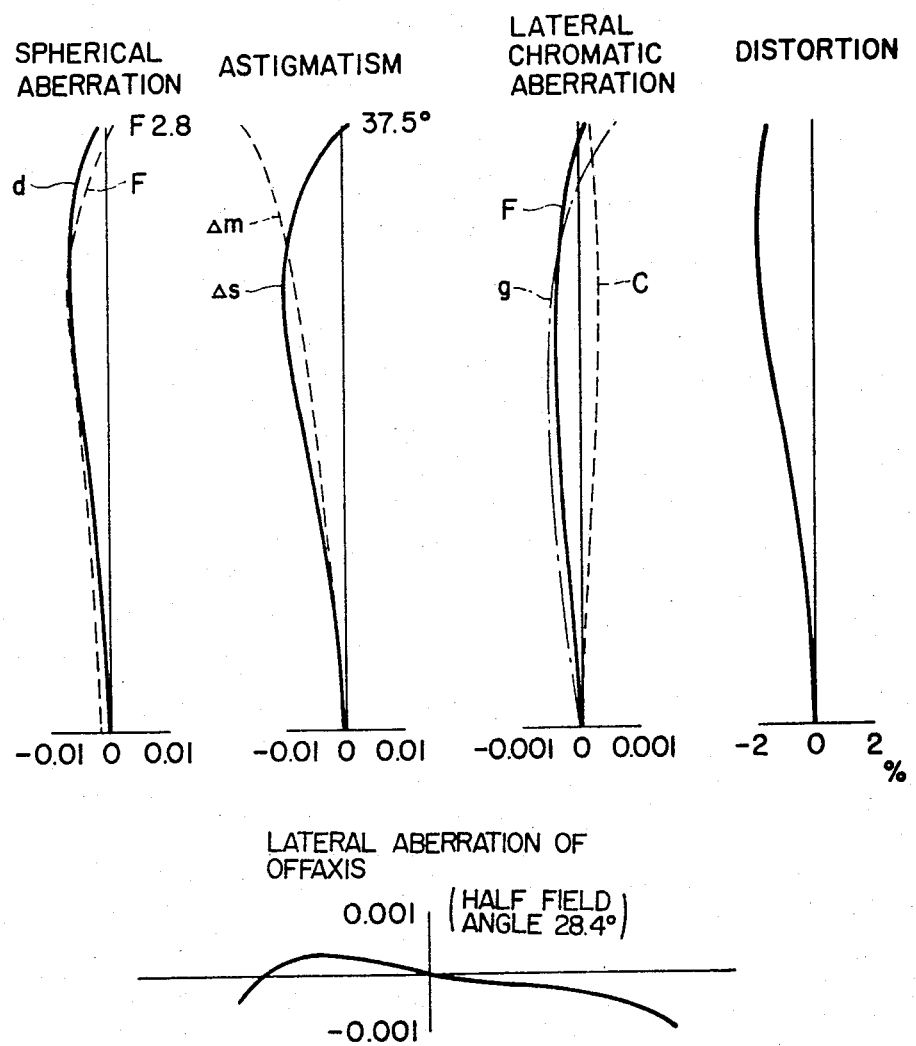
FIG. 2 shows curves illustrating the aberration characteristics of the Embodiment 1.
Figure 3:
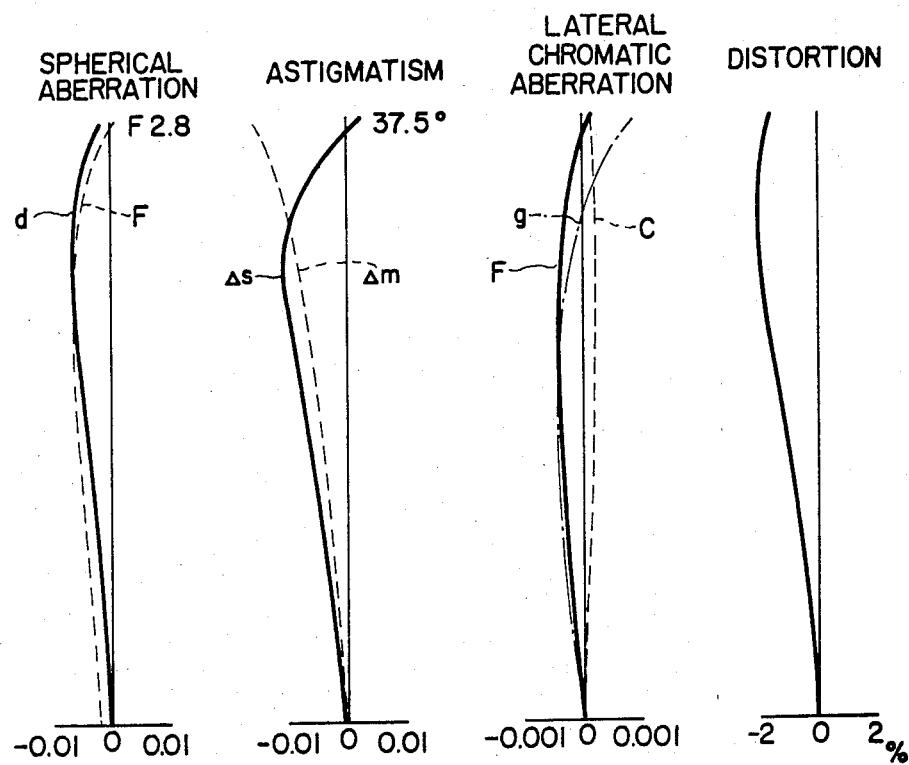
FIG. 3 shows curves illustrating the aberration characteristics of the Embodiment 2.
Figure 3:
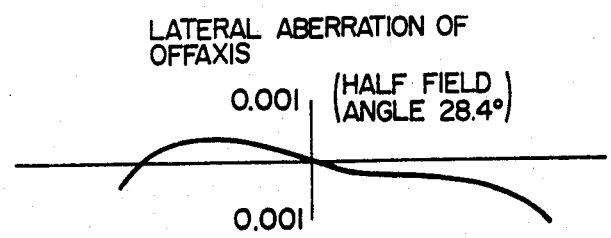
Figure 4:
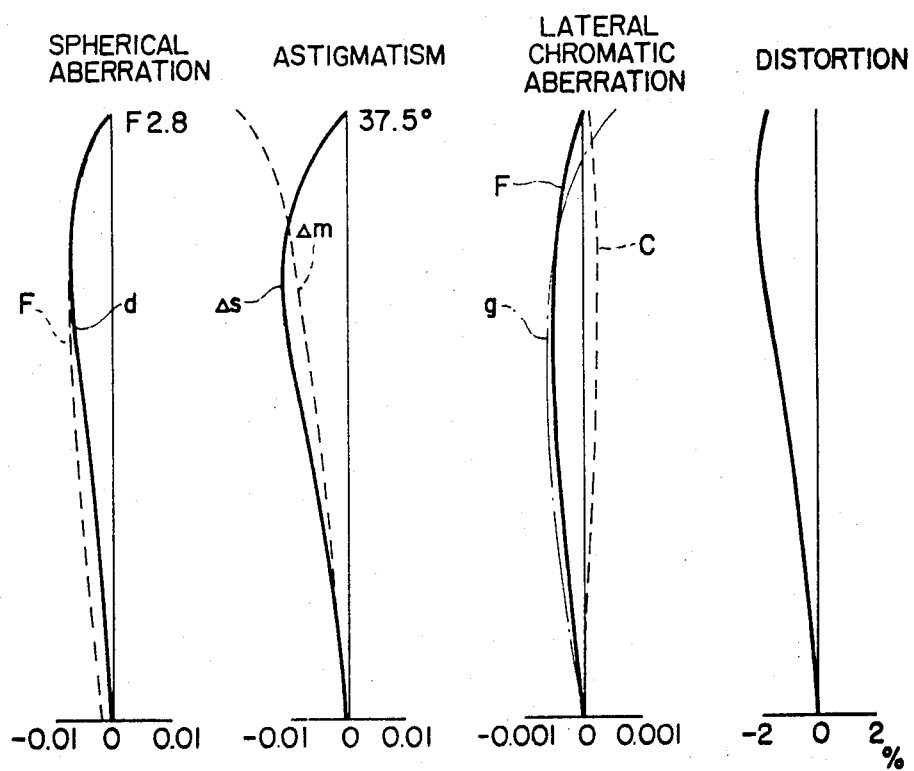
FIG. 4 shows curves illustrating the aberration characteristics of the Embodiment 3.
Figure 4:
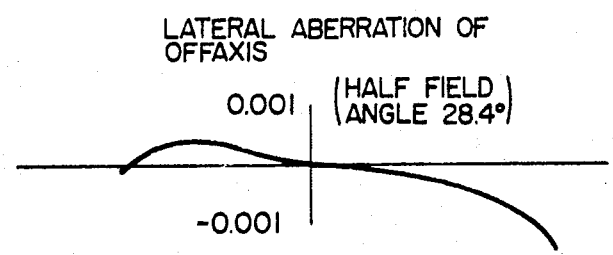

Now, some preferred embodiments of the wide-angle photographic camera lens system according to the present invention will be described with reference to the accompanied drawings:

Embodiment 1

| | | |
|---|---|---|
| $r_1 = 2.217$ | | |
| $d_1 = 0.107$ | $n_1 = 1.72$ | $\nu_1 = 42.08$ |
| $r_2 = 9.684$ | | |
| $d_2 = 0.004$ | | |
| $r_3 = 1.663$ | | |
| $d_3 = 0.135$ | $n_2 = 1.61342$ | $\nu_2 = 57.41$ |
| $r_4 = 0.367$ | | |
| $d_4 = 0.453$ | | |
| $r_5 = 0.872$ | | |
| $d_5 = 0.362$ | $n_3 = 1.762$ | $\nu_3 = 40.20$ |
| $r_6 = -1.116$ | | |
| $d_6 = 0.068$ | | |
| $r_7 = -0.844$ | | |
| $d_7 = 0.035$ | $n_4 = 1.78472$ | $\nu_4 = 25.71$ |
| $r_8 = 1.127$ | | |
| $d_8 = 0.053$ | | |
| $r_9 = -1.523$ | | |
| $d_9 = 0.08$ | $n_5 = 1.61375$ | $\nu_5 = 56.36$ |
| $r_{10} = -0.574$ | | |
| $d_{10} = 0.004$ | | |
| $r_{11} = 11.444$ | | |
| $d_{11} = 0.068$ | $n_6 = 1.61272$ | $\nu_6 = 58.75$ |
| $r_{12} = -0.940$ | | |
| $f = 1$ | | |
| $f_B = 1.333$ | | |
| $L = 2.7$ | | |
| $|f_{12}|/f = 1.073$ | | |

Embodiment 2

| | | |
|---|---|---|
| $r_1 = 2.354$ | | |
| $d_1 = 0.091$ | $n_1 = 1.72$ | $\nu_1 = 42.08$ |
| $r_2 = 11.079$ | | |
| $d_2 = 0.004$ | | |
| $r_3 = 1.618$ | | |
| $d_3 = 0.128$ | $n_2 = 1.61272$ | $\nu_2 = 58.75$ |
| $r_4 = 0.369$ | | |
| $d_4 = 0.457$ | | |
| $r_5 = 0.844$ | | |
| $d_5 = 0.345$ | $n_3 = 1.762$ | $\nu_3 = 40.2$ |
| $r_6 = -1.183$ | | |
| $d_6 = 0.071$ | | |
| $r_7 = -0.852$ | | |
| $d_7 = 0.035$ | $n_4 = 1.78472$ | $\nu_4 = 25.71$ |
| $r_8 = 1.090$ | | |
| $d_8 = 0.053$ | | |
| $r_9 = -1.646$ | | |
| $d_9 = 0.079$ | $n_5 = 1.61375$ | $\nu_5 = 56.36$ |
| $r_{10} = -0.570$ | | |
| $d_{10} = 0.004$ | | |
| $r_{11} = 15.475$ | | |
| $d_{11} = 0.067$ | $n_6 = 1.61272$ | $\nu_6 = 58.75$ |
| $r_{12} = -0.950$ | | |
| $f = 1$ | | |
| $f_B = 1.333$ | | |
| $L = 2.66$ | | |
| $|f_{12}|/f = 1.071$ | | |

Embodiment 3

| | | |
|---|---|---|
| $r_1 = 2.967$ | | |
| $d_1 = 0.111$ | $n_1 = 1.75453$ | $\nu_1 = 35.27$ |
| $r_2 = 23.813$ | | |
| $d_2 = 0.004$ | | |
| $r_3 = 1.496$ | | |
| $d_3 = 0.138$ | $n_2 = 1.61520$ | $\nu_2 = 58.75$ |
| $r_4 = 0.345$ | | |
| $d_4 = 0.365$ | | |
| $r_5 = 0.895$ | | |
| $d_5 = 0.363$ | $n_3 = 1.79917$ | $\nu_3 = 45.27$ |
| $r_6 = -1.725$ | | |
| $d_6 = 0.068$ | | |
| $r_7 = -1.787$ | | |
| $d_7 = 0.035$ | $n_4 = 1.79192$ | $\nu_4 = 25.71$ |
| $r_8 = 1.047$ | | |
| $d_8 = 0.053$ | | |
| $r_9 = -1.203$ | | |
| $d_9 = 0.083$ | $n_5 = 1.61934$ | $\nu_5 = 62.79$ |
| $r_{10} = -0.581$ | | |
| $d_{10} = 0.004$ | | |
| $r_{11} = 31.956$ | | |
| $d_{11} = 0.069$ | $n_6 = 1.61934$ | $\nu_6 = 62.79$ |
| $r_{12} = -0.872$ | | |
| $f = 1$ | | |

-continued

| | | |
|---|---|---|
| $f_B = 1.333$ | | |
| $L = 2.626$ | | |
| $|f_{12}|/f = 0.974$ | | | wherein the reference symbols $r_1$ through $r_{12}$ represent radii of curvature on the surfaces of the respective lenses, the reference symbols $d_1$ through $d_{11}$ designate thicknesses of the respective lenses and airspaces therebetween, the reference symbols $n_1$ through $n_6$ denote refractive indices of the respective lenses, the reference symbols $\nu_1$ through $\nu_6$ represent Abbe's numbers of the respective lenses, the reference symbol $f_B$ designates back focal length and the reference symbol L denotes distace as measured from the object side of the first lens to the film surface.

I claim:

1. A wide-angle photographic camera lens system comprising a first positive meniscus lens, a second negative meniscus lens, a third positive thick lens, a fourth negative lens, a fifth positive meniscus lens and a sixth positive lens, and said lens system satisfying the following conditions:

$$1/1.15 < f/|f_{12}| < 1/0.9, \quad f_{12} < 0 \tag{1}$$

$$0.35 < d_4/f < 0.5 \tag{2}$$

$$0.33 < r_4/f < 0.38 \tag{3}$$

$$45 > \nu_1 \tag{4}$$

$$\nu_2 > 50 \tag{5}$$

wherein the reference symbol f represents total focal length of said lens system as a whole, the reference symbol $f_{12}$ designates total focal length of said first and second lenses as a whole, the reference symbol $d_4$ denotes the airspace between the second and third lenses, the reference symbol $r_4$ represents radius of curvature on the image side surface of the second lens, the reference symbols $\nu_1$ and $\nu_2$ designate Abbe's numbers of the first and second lenses respectively.

2. A wide-angle photographic camera lens system according to claim 1 having the following numerical data:

| | | |
|---|---|---|
| $r_1 = 2.217$ | | |
| $d_1 = 0.107$ | $n_1 = 1.72$ | $\nu_1 = 42.08$ |
| $r_2 = 9.684$ | | |
| $d_2 = 0.004$ | | |
| $r_3 = 1.663$ | | |
| $d_3 = 0.135$ | $n_2 = 1.61342$ | $\nu_2 = 57.41$ |
| $r_4 = 0.367$ | | |
| $d_4 = 0.453$ | | |
| $r_5 = 0.872$ | | |
| $d_5 = 0.362$ | $n_3 = 1.762$ | $\nu_3 = 40.20$ |
| $r_6 = -1.116$ | | |
| $d_6 = 0.068$ | | |
| $r_7 = -0.844$ | | |
| $d_7 = 0.035$ | $n_4 = 1.78472$ | $\nu_4 = 25.71$ |
| $r_8 = 1.127$ | | |
| $d_8 = 0.053$ | | |
| $r_9 = -1.523$ | | |
| $d_9 = 0.08$ | $n_5 = 1.61375$ | $\nu_5 = 56.36$ |
| $r_{10} = -0.574$ | | |
| $d_{10} = 0.004$ | | |
| $r_{11} = 11.444$ | | |
| $d_{11} = 0.068$ | $n_6 = 1.61272$ | $\nu_6 = 58.75$ |
| $r_{12} = -0.940$ | | |
| $f = 1$ | | |
| $f_B = 1.333$ | | |
| $L = 2.7$ | | |

-continued $|f_{12}|/f = 1.073$ wherein the reference symbols $r_1$ through $r_{12}$ represent radii of curvature on the surfaces of the respective lenses, the reference symbols $d_1$ through $d_{11}$ designate thicknesses of the respective lenses and airspaces therebetween, the reference symbols $n_1$ through $n_6$ denote refractive indices of the respective lenses, the reference symbols $\nu_1$ through $\nu_6$ represent Abbe's numbers of the respective lenses, the reference symbol f designates total focal length of the lens system as a whole, the reference symbol $f_B$ denote back focal length, the reference symbol L represents total length of the lens system as a whole and the reference symbol $f_{12}$ designates total focal length of the first and second lenses as a whole.

3. A wide-angle photographic camera lens system according to claim 1 having the following numerical data:

| | | |
|---|---|---|
| $r_1 = 2.354$ | | |
| $d_1 = 0.091$ | $n_1 = 1.72$ | $\nu_1 = 42.08$ |
| $r_2 = 11.079$ | | |
| $d_2 = 0.004$ | | |
| $r_3 = 1.618$ | | |
| $d_3 = 0.128$ | $n_2 = 1.61272$ | $\nu_2 = 58.75$ |
| $r_4 = 0.369$ | | |
| $d_4 = 0.457$ | | |
| $r_5 = 0.844$ | | |
| $d_5 = 0.345$ | $n_3 = 1.762$ | $\nu_3 = 40.2$ |
| $r_6 = -1.183$ | | |
| $d_6 = 0.071$ | | |
| $r_7 = -0.852$ | | |
| $d_7 = 0.035$ | $n_4 = 1.78472$ | $\nu_4 = 25.71$ |
| $r_8 = 1.090$ | | |
| $d_8 = 0.053$ | | |
| $r_9 = -1.646$ | | |
| $d_9 = 0.079$ | $n_5 = 1.61375$ | $\nu_5 = 56.36$ |
| $r_{10} = -0.570$ | | |
| $d_{10} = 0.004$ | | |
| $r_{11} = 15.475$ | | |
| $d_{11} = 0.067$ | $n_6 = 1.61272$ | $\nu_6 = 58.75$ |
| $r_{12} = -0.950$ | | |
| $f = 1$ | | |
| $f_B = 1.333$ | | |
| $L = 2.66$ | | |
| $|f_{12}|/f = 1.071$ | | | wherein the reference symbols $r_1$ through $r_{12}$ represent radii of curvature on the surfaces of the respective lenses, the reference symbols $d_1$ through $d_{11}$ designate thicknesses of the respective lenses and airspaces therebetween, the reference symbols $n_1$ through $n_6$ denote refractive indices of the respective lenses, the reference symbols $\nu_1$ through $\nu_6$ represent Abbe's numbers of the respective lenses, the reference symbol f designates total focal length of the lens system as a whole, the reference symbol $f_B$ denote back focal length, the reference symbol L represents total length of the lens system as a whole and the reference symbol $f_{12}$ designates total focal length of the first and second lenses as a whole.

4. A wide-angle photographic camera lens system according to claim 1 having the following numerical data:

| | | |
|---|---|---|
| $r_1 = 2.967$ | | |
| $d_1 = 0.111$ | $n_1 = 1.75453$ | $\nu_1 = 35.27$ |
| $r_2 = 23.813$ | | |
| $d_2 = 0.004$ | | |
| $r_3 = 1.496$ | | |
| $d_3 = 0.138$ | $n_2 = 1.61520$ | $\nu_2 = 58.75$ |
| $r_4 = 0.345$ | | |
| $d_4 = 0.365$ | | |
| $r_5 = 0.895$ | | |
| $d_5 = 0.363$ | $n_3 = 1.79917$ | $\nu_3 = 45.27$ |
| $r_6 = -1.725$ | | |
| $d_6 = 0.068$ | | |
| $r_7 = -1.787$ | | |
| $d_7 = 0.035$ | $n_4 = 1.79192$ | $\nu_4 = 25.71$ |
| $r_8 = 1.047$ | | |
| $d_8 = 0.053$ | | |
| $r_9 = -1.203$ | | |
| $d_9 = 0.083$ | $n_5 = 1.61934$ | $\nu_5 = 62.79$ |
| $r_{10} = -0.581$ | | |
| $d_{10} = 0.004$ | | |
| $r_{11} = 31.956$ | | |
| $d_{11} = 0.069$ | $n_6 = 1.61934$ | $\nu_6 = 62.79$ |
| $r_{12} = -0.872$ | | |
| $f = 1$ | | |
| $f_B = 1.333$ | | |
| $L = 2.626$ | | |
| $|f_{12}|/f = 0.974$ | | | wherein the reference symbols $r_1$ through $r_{12}$ represent radii of curvature on the surfaces of the respective lenses, the reference symbols $d_1$ through $d_{11}$ designate thicknesses of the respective lenses and airspaces therebetween, the reference symbols $n_1$ through $n_6$ denote refractive indices of the respective lenses, the reference symbols $\nu_1$ through $\nu_6$ represent Abbe's numbers of the respective lenses, the reference symbol f designates total focal length of the lens system as a whole, the reference symbol $f_B$ denote back focal length, the reference symbol L represents total length of the lens system as a whole and the reference symbol $f_{12}$ designates total focal length of the first and second lenses as a whole.

* * * * *

UNITED STATES PATENT AND TRADEMARK OFFICE
CERTIFICATE OF CORRECTION

PATENT NO. : 4,221,467
DATED : Sept. 9, 1980
INVENTOR(S) : Toshihiro IMAI

It is certified that error appears in the above—identified patent and that said Letters Patent is hereby corrected as shown below:

In the heading

[22] Change "Mar. 30, 1980" to read

--Mar. 30, 1978--

Signed and Sealed this

Twenty-fourth Day of February 1981

[SEAL]

Attest:

RENE D. TEGTMEYER

Attesting Officer

Acting Commissioner of Patents and Trademarks